(12) United States Patent
Liu et al.

(10) Patent No.: US 10,962,811 B2
(45) Date of Patent: Mar. 30, 2021

(54) MONOLITHIC ELECTRO-OPTICAL MODULATOR WITH COMB-SHAPED TRANSMISSION LINE

(71) Applicant: SiFotonics Technologies Co., Ltd., Grand Cayman (KY)

(72) Inventors: Yadong Liu, Beijing (CN); Tzung-I Su, Taoyuan (TW); Dong Pan, Andover, MA (US)

(73) Assignee: SiFotonics Technologies Co., Ltd.

( * ) Notice: Subject to any disclaimer, the term of this patent is extended or adjusted under 35 U.S.C. 154(b) by 0 days.

(21) Appl. No.: 16/706,107

(22) Filed: Dec. 6, 2019

(65) Prior Publication Data

US 2020/0183197 A1 Jun. 11, 2020

Related U.S. Application Data

(60) Provisional application No. 62/917,396, filed on Dec. 6, 2018.

(51) Int. Cl.
*G02F 1/025* (2006.01)
*G02B 6/12* (2006.01)
*G02F 1/015* (2006.01)

(52) U.S. Cl.
CPC ......... *G02F 1/025* (2013.01); *G02B 6/12004* (2013.01); *G02F 2001/0151* (2013.01); *G02F 2203/50* (2013.01)

(58) Field of Classification Search
CPC ............. G02F 1/025; G02F 2001/0151; G02F 2203/50; G02B 6/12004
USPC ........................................................... 385/2
See application file for complete search history.

(56) References Cited

U.S. PATENT DOCUMENTS

| 2005/0082084 A1* | 4/2005 | Drubel | H02K 3/04 174/129 R |
| 2005/0123260 A1* | 6/2005 | Liu | G02F 1/025 385/131 |
| 2013/0209112 A1* | 8/2013 | Witzens | G02B 6/423 398/214 |
| 2014/0127842 A1* | 5/2014 | Song | H01P 11/001 438/31 |
| 2016/0085133 A1* | 3/2016 | Denoyer | G02F 1/2255 385/3 |

* cited by examiner

Primary Examiner — Jerry M Blevins
(74) Attorney, Agent, or Firm — Han IP PLLC; Andy M. Han

(57) ABSTRACT

Various embodiments of a monolithic electro-optical (E-O) modulator are described, which may be fabricated on a silicon-on-insulator substrate. The monolithic E-O modulator includes an optical waveguide that allows an optical signal to propagate therein. The monolithic E-O modulator also includes a comb-shaped transmission line for conducting an electrical modulation signal that modulates the optical signal. The comb-shaped transmission line includes electrical conductors running in parallel with the optical waveguide. At least one of the conductors includes recesses or thin slots that form the conductor into a shape having a plurality of teeth, like a comb. The comb-shaped transmission line can be engineered to realize a close matching between a propagation velocity of the optical signal along the optical waveguide and a group velocity of the electrical modulation signal along the comb-shaped transmission line, which helps to achieve a high operating speed of the monolithic E-O modulator.

19 Claims, 12 Drawing Sheets

MONOLITHIC ELECTRO-OPTICAL MODULATOR WITH COMB-SHAPED TRANSMISSION LINE

CROSS-REFERENCE TO RELATED PATENT APPLICATIONS

The present disclosure claims the priority benefit of U.S. Patent Application No. 62/917,396, filed on Dec. 6, 2018. The aforementioned application is incorporated by reference in its entirety.

TECHNICAL FIELD

The present disclosure relates to the technical field of optical modulators. More particularly, the present disclosure relates to a monolithic electro-optical modulator having a comb-shaped transmission line structure.

BACKGROUND

A monolithic electro-optical (E-O) modulator, such as a miniaturized Mach-Zehnder modulator (MZM) fabricated on a substrate, is a key component in various modern digital communication systems. The substrate is usually a semiconductor substrate such as a silicon (Si) or silicon-on-insulator (SOI) substrate, on which the monolithic E-O modulator is fabricated using fabrication techniques similar to those employed in manufacturing semiconductor integrated circuits (ICs). The monolithic E-O modulator may include various miniaturized optical components, such as waveguides, optical couplers, optical splitters, and/or phase shifters. The monolithic E-O modulator may also include various miniaturized electrical components, such as resistors, capacitors, diodes, and/or electrodes. Both the optical components and the electrical components are fabricated on the same substrate. A monolithic E-O modulator of the present disclosure is hereinafter interchangeably referred as an "E-O modulator", or simply a "modulator".

An optical signal may enter a waveguide of a modulator, and the modulator may change an intensity, a phase, or both, of the optical signal as the optical signal propagates through the modulator. Specifically, the amount of change in intensity and/or phase induced therein depends on an electrical modulation voltage or signal that is applied to the modulator. The electrical modulation signal is typically applied to the modulator through a transmission line that runs in parallel with the waveguide. As a control signal for the modulator, the modulation voltage may include a time-varying radio-frequency (RF) component and a static direct-current (DC) component.

A key performance of an E-O modulator is its bandwidth, which is directly related to the highest operating speed of the E-O modulator. An E-O modulator capable of operating at a high speed is desired because a higher operating speed enables a system employing the E-O modulator (e.g., a communication system) to operate faster, transferring more data per period of time. The bandwidth of an E-O modulator is greatly affected by how well matched between a propagation velocity of the optical signal along the optical waveguide (referred as "the optical path"), and a propagation velocity of the electrical modulation signal along the transmission line (referred as "the electrical path"). A close match in propagation velocity between the optical path and the electrical path helps to increase the bandwidth of the E-O modulator. On the other hand, a velocity mismatch between the optical path and the electrical path adversely affects the operating speed of the E-O modulator.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

In one aspect, a monolithic electro-optical (E-O) modulator is provided. The monolithic E-O modulator includes an optical waveguide that runs along a main propagation direction, as well as a transmission line that runs in parallel with the optical waveguide. The optical waveguide is configured to accommodate an optical signal that propagates along the main propagation direction, whereas the transmission line is configured to conduct an electrical modulation signal that modulates the optical signal.

Specifically, the monolithic E-O modulator is made of modulator sections concatenated in series along the main propagation direction. Each modulator section includes a waveguide section, a first conductor section, and a second conductor section, all extending along the main propagation direction. The first and second conductor sections are disposed on two opposing sides of the waveguide section. The waveguide sections of the plurality of modulator sections collectively form the optical waveguide of the E-O modulator. In some embodiments, the transmission line of the E-O modulator has a coplanar strip (CPS) electrode structure, which is formed by a first conductor and a second conductor, both running in parallel with the optical waveguide. The first conductor is formed by the first conductor sections of the plurality of modulator sections as the plurality of modulator sections are concatenated. Likewise, the second conductor is formed by the second conductor sections of the plurality of modulator sections as the plurality of modulator sections are concatenated.

In some embodiments, the transmission line of the E-O modulator has a coplanar waveguide (CPW) electrode structure, which is formed by an additional third conductor that runs in parallel with the first and second conductors. Similar to the first and second conductors, the third conductor is formed by a plurality of concatenated conductor sections. Specifically, in an event that the transmission line takes a CPW electrode structure, each of the modulator section further includes a third conductor section. The third conductor section and the second conductor section are symmetrical with respect to the first conductor section. The third conductor sections of the plurality of modulator sections collectively form the third conductor when the modulator sections are concatenated in series.

Each of the modulator sections of the E-O modulator includes one or more ridges that extend along the main propagation direction. Moreover, each modulator section can be divided into an active segment and a passive segment. The active segment has one or more p-n junction diodes, and each of the p-n junction diodes has a p-n junction located within a respective one of the ridges of the modulator section. Each p-n junction diode is formed by a p-type stripe and a n-type stripe that are disposed adjacent to one another, along the main propagation direction. The p-n junction is formed between the p-type stripe and the n-type stripe.

For each modulator section of the E-O modulator, either or both of the first conductor section and the second conductor section have at least one recess formed therein. The recess extends from an edge of the respective conductor section towards a central area of the respective conductor section. The edge is an edge of the respective conductor section that is in parallel with the main propagation direction. The edge may be an edge that is closer to the optical waveguide, or an edge that is away from the optical waveguide. The recess may be viewed as having an opening at the edge. That is, the recess starts from the opening and extends towards the central area into a slot. In an example embodiment, the slot extends in a direction that is substantially perpendicular to the main propagation direction. The slot may for example have a zigzag shape, or a spiral shape, that extends substantially perpendicular to the main propagation direction.

In an event that the opening of the recess is at the edge that is closer to the optical waveguide, the opening is connected with the waveguide section. In some embodiments, the opening may be facing the active segment of the waveguide section, where one or more p-n junction diodes are present. Alternatively, the opening may be aligned with the passive segment of the waveguide section, where no p-n junction diode is present.

In some embodiments, both the first and second conductor sections of each modulator section have one or more recesses. Moreover, the recess(es) of the first conductor section and the recess(es) of the second conductor section are symmetrical with respect to the waveguide section.

In an event that each of the modulator sections further includes the third conductor section, the second conductor section and the third conductor section may be symmetrical with respect to the first conductor section, including the recess(es) they may have.

In some embodiments of the E-O modulator, each waveguide section has only one ridge, and each active segment has only one p-n junction diode. The p-n junction diode is substantially reversed-biased by the electrical modulation signal.

In some embodiments of the E-O modulator, each waveguide section has two ridges, and each active segment has two p-n junction diodes. The two p-n junction diodes are connected in series with reversed polarity. That is, either the p-type stripes of the two p-n junction diodes are electrically coupled together, or the n-type stripes of the two p-n junction diodes are electrically coupled together. In either case, at any time, one of the two p-n junction diodes is substantially reverse-biased by the electrical modulation signal, while the other of the two p-n junction diodes is substantially forward-biased by the electrical modulation signal.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter. The left-most digit(s) of a reference number identifies the figure in which the reference number first appears. The use of the same reference numbers in different figures indicates similar or identical items.

DETAILED DESCRIPTION OF THE PREFERRED EMBODIMENTS

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

As described above, a matching of propagation velocity between the optical path and the electrical path of a monolithic electro-optical (E-O) modulator is important to the performance of the E-O modulator. Specifically, a monolithic E-O modulator is able to operate at a higher speed if the velocity at which the optical signal propagates along the optical waveguide matches well with the velocity at which the electrical modulation signal propagates along the transmission line. On the other hand, the operating speed of the monolithic E-O modulator would be adversely affected should a significant velocity mismatch between the optical and the electrical paths occur, especially when the monolithic E-O modulator has a longer propagation length. An E-O modulator suitable for commercial optical communication applications is often fabricated on a silicon (Si) or silicon-on-insulator (SOI) substrate monolithically. The optical waveguide of such a monolithic E-O modulator typically has a group refractive index in a range of 3.8-3.9 due to the material characteristics of silicon. The electrical transmission line, however, typically exhibits a microwave propagation index that is way below 3.8, regardless if it is a coplanar strip (CPS) transmission line or a coplanar waveguide (CPW) transmission line. Consequently, the electrical modulation signal tends to travel at a higher speed along the electrical transmission line as compared to the optical signal propagating down the optical waveguide, thereby causing a significant velocity mismatch that compromises the bandwidth of the E-O modulator. As a result, the bandwidth of the E-O modulator is compromised.

The various embodiments of monolithic E-O modulators described herein are capable of slowing down the propagation velocity of the electrical modulation signal so that the velocity mismatch between the optical path and the electrical path is minimized. Specifically, the present disclosure advocates having a slow-wave transmission line to bring the propagation velocity of the electrical modulation signal to be close to the propagation velocity of the optical signal.

Figure 1:
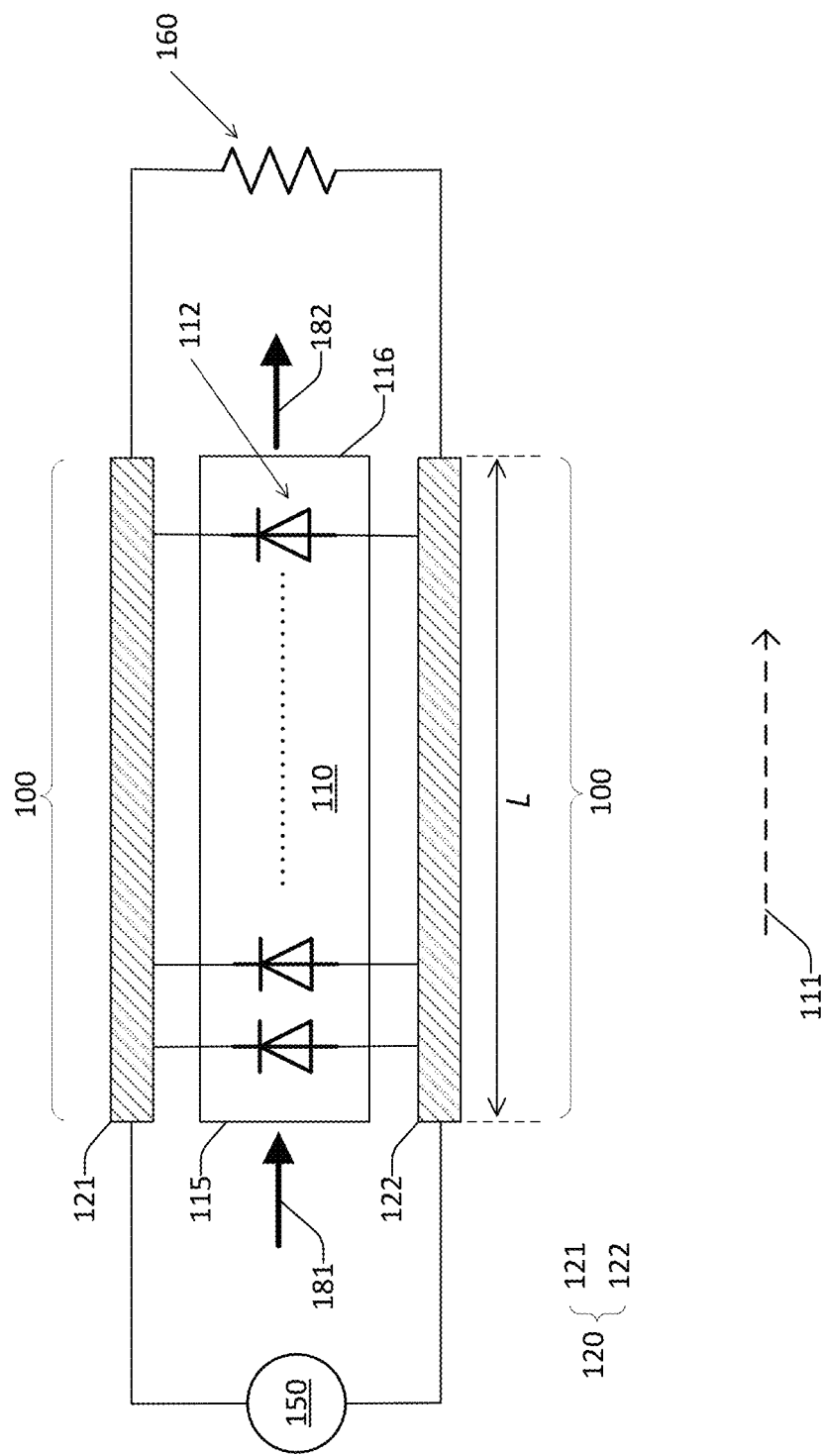
FIG. 1 is a schematic diagram of a monolithic electro-optical (E-O) modulator driven by an electrical modulation signal in accordance with an embodiment of the present disclosure.

FIG. 1 illustrates a schematic diagram of an example E-O modulator 100 driven by a voltage source 150 and terminated by a load 160. The E-O modulator 100 includes an optical waveguide 110, of a length L along a main propagation direction 111. The optical waveguide 110 is configured to accommodate an optical signal that propagates, along the main propagation direction 111, from a first end 115 of the optical waveguide 110 to a second end 116 of the optical waveguide 110. In FIG. 1, an arrow 181 represents the optical signal as the optical signal enters the optical waveguide 110, whereas an arrow 182 represents the optical signal as the optical signal exits the optical waveguide 110. The optical waveguide 110 may have one or more optical arms within which the optical signal travels. In some embodiments, the E-O modulator 100 may include an optical coupler for coupling the optical wave to the optical arm(s) of the optical waveguide 110.

The E-O modulator 100 additionally includes a transmission line 120. In various embodiments, the transmission line 120 may include two or more electrical conductors. Each of the two or more electrical conductors runs in parallel with the optical waveguide 110 along the main propagation direction 111. As shown in FIG. 1, the transmission line 120 includes two electrical conductors 121 and 122, each having a length same as that of the optical waveguide 110. In some example embodiments, the electrical conductors 121 and 122 may form a CPS transmission line. As disclosed in greater detail further below, the transmission line 120 is a slow-wave transmission line.

The voltage source 150 generates an electrical modulation signal for modulating the optical signal that propagates in the optical waveguide 110. That is, through the E-O modulator 100, the electrical modulation signal can change an intensity and/or a phase of the optical signal. The modulation signal is coupled to the transmission line 120 by connecting a first end of the transmission line 120 to the voltage source 150, whereas the first end of the transmission line 120 is adjacent to the first end 115 of the optical waveguide 110. Specifically, the voltage source 150 has two terminals, which are electrically connected to a first end of the electrical conductor 121 and a first end of the electrical conductor 122, respectively. The transmission line 120 is electrically connected to the load 160 at a second end of the transmission line 120, whereas the second end of the transmission line 120 is adjacent to the second end 116 of the optical waveguide 110. The load 160 also has two terminals, which are electrically connected to a second end of the electrical conductor 121 and a second end of the electrical conductor 122, respectively. The modulation signal travels on the transmission line 120 from the first end of the transmission line 120 toward the second end of the transmission line 120, and then is absorbed by the load 160.

The optical waveguide 110 includes a plurality of p-n junction diodes 112. The p-n junction diodes 112 are integrated in the optical waveguide 110, distributed in sequence along the main propagation direction 111. The p-n junction diodes 112 are connected in parallel between the electrical conductors 121 and 122, so that the modulation signal on the transmission line 120 biases the p-n junction diodes 112 as the modulation signal travels on the transmission line 120 from the voltage source 150 to the load 160. The modulation signal may for example have a sinusoidal waveform that has a time-varying radio-frequency (RF) component and a static direct-current (DC) component. Depending on the specific waveform of the modulation signal, the p-n junction diodes 112 may be forwardly biased, zero-biased, or reversely biased by the electrical modulation signal at various times and/or at various locations along the optical waveguide 110. Namely, at any given time, each of the p-n junction diodes 112 may be biased differently by the modulation signal. Also, any particular one of the p-n junction diodes 112 may be biased differently by the modulation signal at various times.

Figure 2:
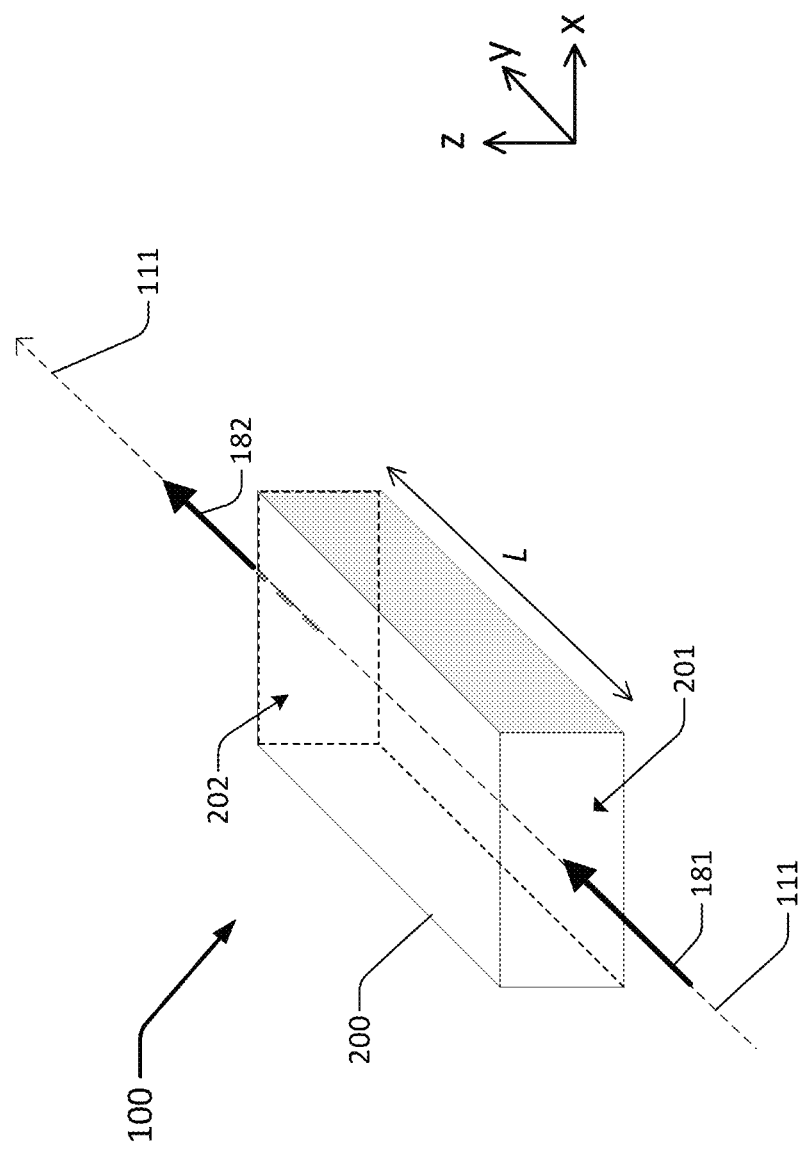
FIG. 2 illustrates a perspective view of a monolithic E-O modulator in accordance with an embodiment of the present disclosure.

When monolithically fabricated on a semiconductor substrate, such as a Si or a SOI substrate, the E-O modulator 100 may have a form of a slab, such as a slab 200 of FIG. 2. Specifically, FIG. 2 illustrates a perspective view of the E-O modulator 100 embodied monolithically as the slab 200. FIG. 2 also illustrates the optical wave that passes through the E-O modulator 100 along the main propagation direction 111. As in FIG. 1, the arrows 181 and 182 of FIG. 2 represents the optical wave entering and existing the E-O modulator 100, respectively. Specifically, the arrow 181 represents the optical wave as it enters the E-O modulator 100 at a front surface 201 of the slab 200, whereas the arrow 182 represents the optical wave as it exits the E-O modulator 100 at a rear surface 202 of the slab 200. Using the Cartesian coordinates of FIG. 2, the main propagation direction 111 is substantially aligned with the y-direction.

Figure 3:
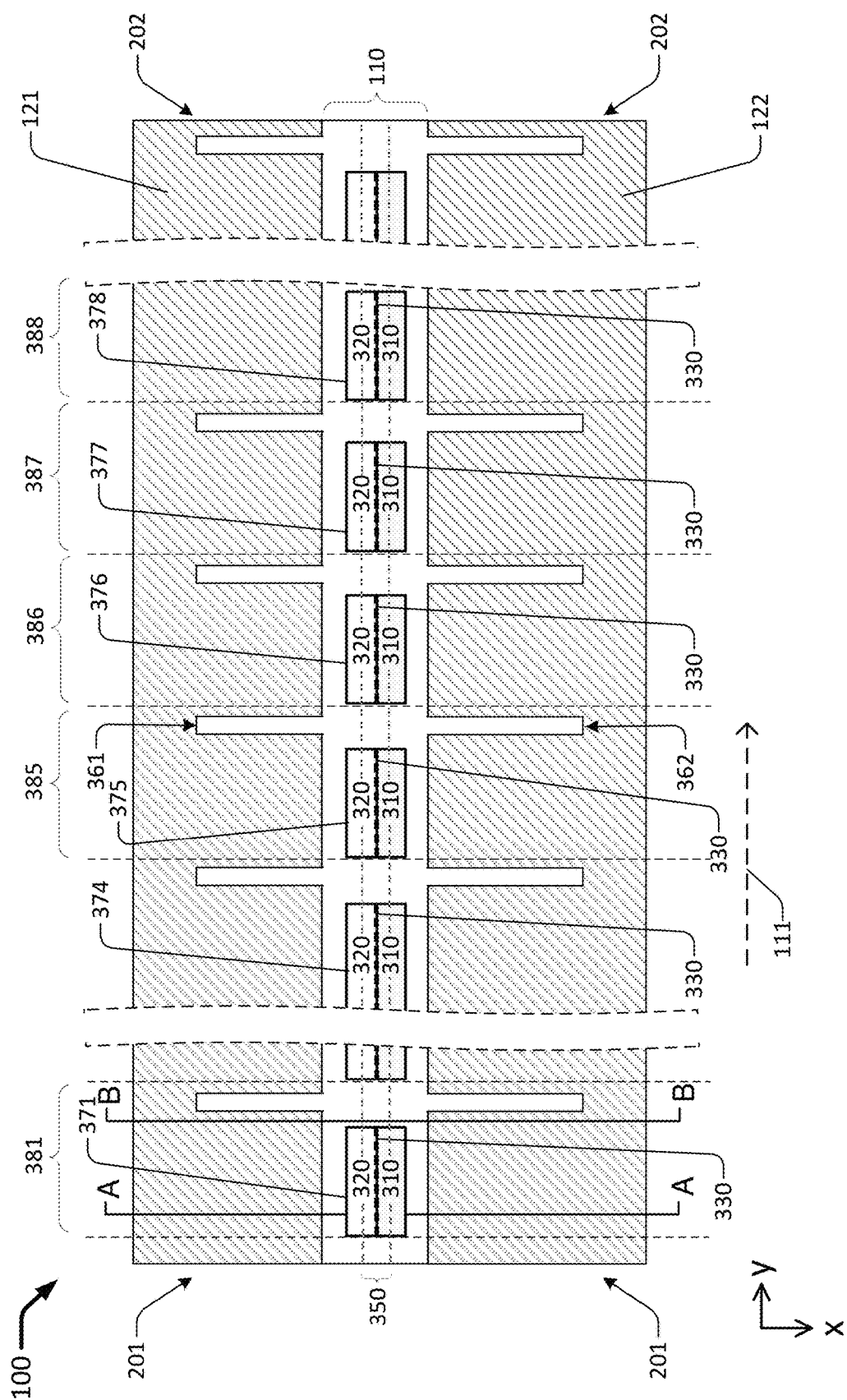
FIG. 3 illustrates a top view of a monolithic E-O modulator that employs coplanar strip (CPS) transmission line in accordance with an embodiment of the present disclosure.

FIG. 3 illustrates an example top view of the slab 200, which embodies the E-O modulator 100. Using the Cartesian coordinates of FIG. 2, the top view of FIG. 3 illustrates the slab 200 viewed from the positive side of the z-axis towards the negative side of the z-axis. As shown in FIG. 3, the optical waveguide 110 extends from the first surface 201 of the slab 200 to the second surface 202 of the slab 200 along the main propagation direction 111. Also shown in FIG. 3 are the electrical conductors 121 and 122, each of which is disposed on a respective side of the optical waveguide 110 and runs along the main propagation direction 111. FIG. 3 further shows the plurality of p-n junction diodes 112, such as p-n junction diodes 371, 374, 375, 376, 377 and 378. The p-n junction diodes 371, 374, 375, 376, 377 and 378 are disposed along the main propagation direction 111 as part of the optical waveguide 110. In addition, each of the plurality of p-n junction diodes 112 includes a p-type stripe (e.g., the p-type stripe 310 of the p-n junction diode 375) and a n-type stripe (e.g., the n-type stripe 320 of the p-n junction diode 375). The p-type stripe 310 and the n-type stripe 320 are aligned along the main propagation direction 111. Moreover, the p-type stripe 310 and the n-type stripe 320 are disposed adjacent to one another, with a p-n junction 330 formed between the p-type stripe 310 and the n-type stripe 320. Although not explicitly shown in FIG. 3, the electrical conductor 121 is electrically coupled to the n-type stripe 320 of each of the plurality of p-n junction diodes 112, whereas the electrical conductor 122 is electrically coupled to the p-type stripe 310 of each of the plurality of p-n junction diodes 112. Thus, each of the plurality of p-n junction diodes 112 is biased by the electrical modulation signal carried by the transmission line 120, i.e., a voltage difference between the electrical conductor 121 and the electrical conductor 122.

The optical waveguide 110 has one or more physical features called "ridges" that extend along the main propagation direction 111. Each of the "ridges" is an elevated portion of the optical waveguide 110. As shown in the example embodiment of FIG. 3, the optical waveguide 110 has a ridge 350, which is physically extruding in the z-direction. Namely, the portion of the optical waveguide 110 within the ridge 350 is thicker (i.e., taller in the z-direction) than the portion of the optical waveguide 110 outside the ridge 350. As shown in FIG. 3, each of the p-n junction diodes 371, 374, 375, 376, 377 and 378 has the respective p-n junction 330 located within the ridge 350.

Figure 4:
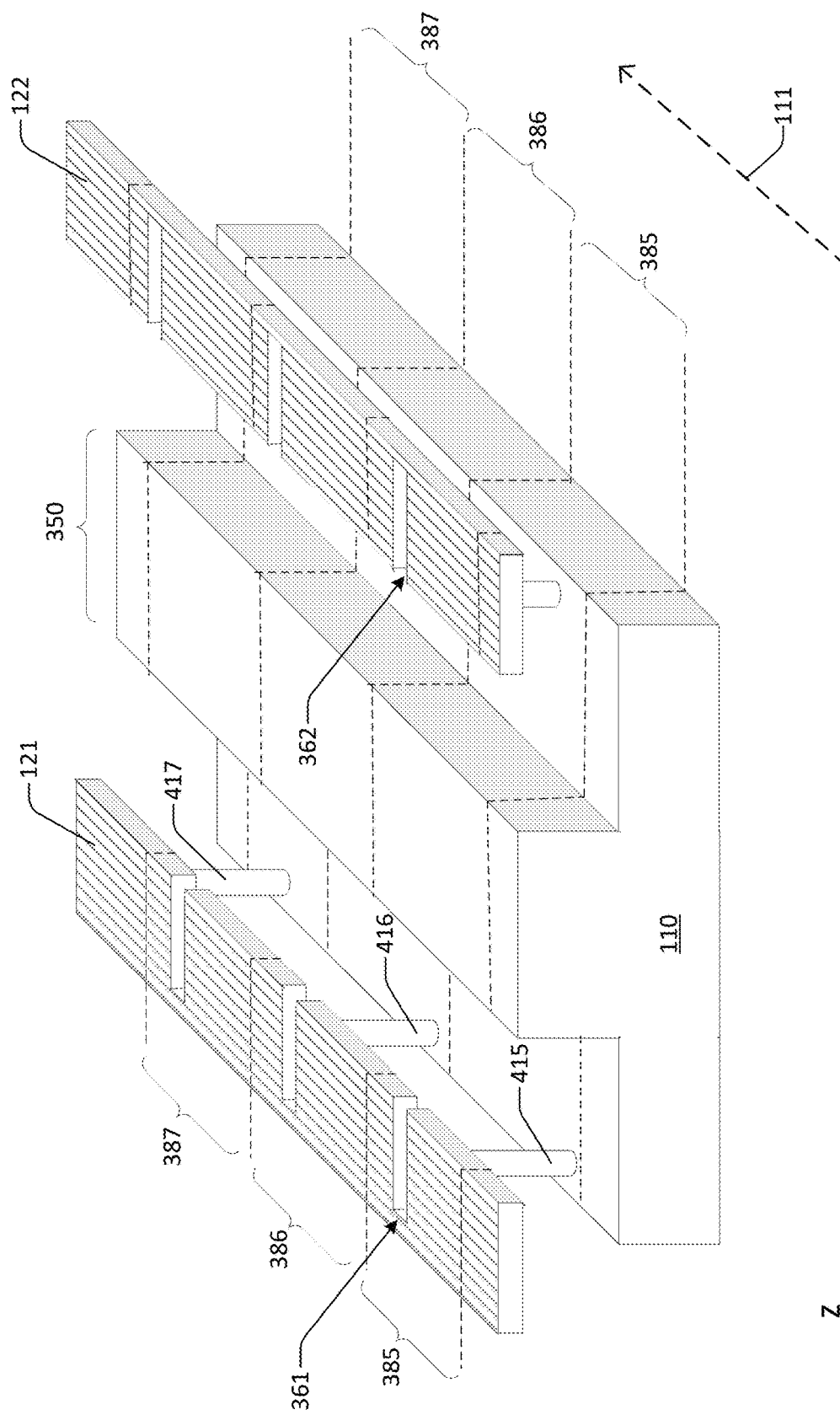
FIG. 4 illustrates a perspective view of a few concatenated modulator sections of a monolithic E-O modulator in accordance with an embodiment of the present disclosure.

The E-O modulator 100 can be viewed as a plurality of sections concatenated in series along the main propagation direction 111. As shown in FIG. 3, the E-O modulator 100 can be conceptually divided into a plurality of sections concatenated one after another, such as sections 381, 385, 386, 387 and 388. Each of the sections is referred as a "modulator section" of the E-O modulator 100. FIG. 4 illustrates a perspective view of a few of the modulator sections concatenated in series. Specifically, FIG. 4 illustrates the modulator sections 385, 386 and 387 concatenated together, with the modulator section 386 connected between the modulator sections 385 and 387. The E-O modulator 100 may be conceptually divided in a way such that the modulator sections 385, 386 and 387 are connected without any discontinuity at the junctions of connection. This can be realized by strategically dividing the E-O modulator 100 so that the two end surfaces of each modulator section have a same dimension.

The perspective view of FIG. 4 also provides a better illustration of the shape of the ridge 350. The ridge 350 is shown as having a thicker thickness and extruding in the z-direction. Also shown in FIG. 4 are vias 415, 416 and 417, which are electrical conductors disposed in the z-direction to electrically couple the electrical conductor 121 to the n-type stripes 320 (not shown in FIG. 4) that are embedded in the optical waveguide 110. Likewise, a plurality of vias are used to electrically couple the electrical conductor 122 to the p-type stripes 310 (not shown in FIG. 4) that are embedded in the optical waveguide 110.

Figure 5:
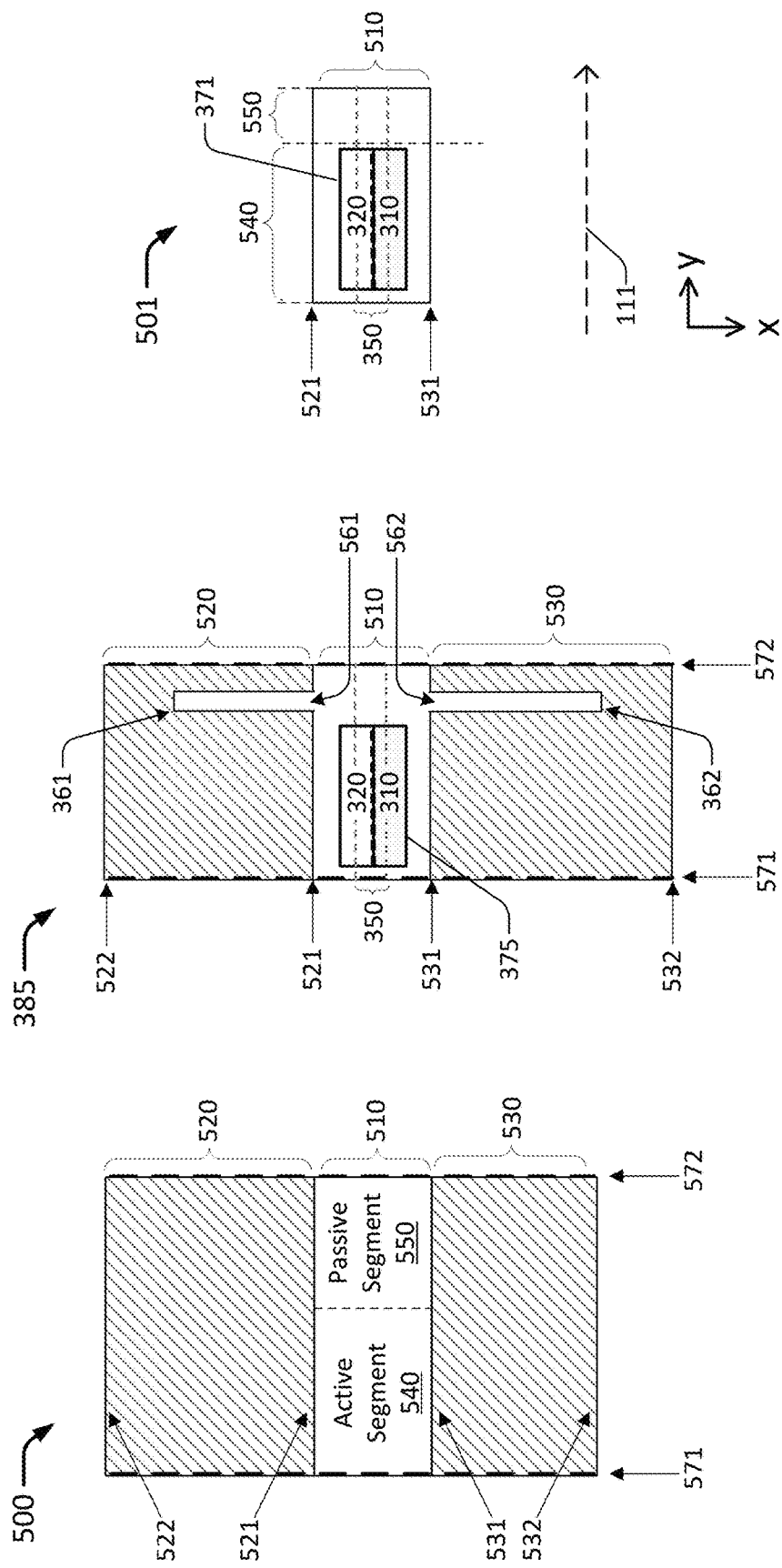
FIG. 5 illustrates a definition of various parts of a modulator section in accordance with an embodiment of the present disclosure.

Just like how the example embodiment of FIG. 3 can be viewed as a plurality of modulator sections concatenated along the main propagation direction 111, various other embodiments of the monolithic E-O modulator 100, as disclosed further below, can also be viewed in the same way. That is, each of the various embodiments of the monolithic E-O modulator 100 can be viewed as a concatenation of multiple instances of a modulator section. Moreover, a modulator section can be defined by several constituting parts or sections, as shown in FIG. 5. Specifically, FIG. 5 illustrates a top view of a generic modulator section 500 that can be used to monolithically embody the E-O modulator 100. The generic modulator section 500 includes three parts: a waveguide section 510, a first conductor section 520, and a second conductor section 530. Each of the three parts extends along the main propagation direction 111 of the monolithic E-O modulator 100 from a front end surface 571 of the generic modulator section 500 to a rear end surface 572 of the generic modulator section 500. The first conductor section 520 and the second conductor section 530 are disposed on two opposing sides of the waveguide section 510. The first conductor section 520 has an inner edge 521 that is adjacent to the waveguide section 510, as well as an outer edge 522 that is farther away from the waveguide section 510. Likewise, the second conductor section 530 has an inner edge 531 that is adjacent to the waveguide section 510, and an outer edge 532 that is farther away from the waveguide section 510. Each of the edges 521, 522, 531 and 532 is substantially aligned with the main propagation direction 111.

When concatenated to form an embodiment of the monolithic E-O modulator 100, the rear end surface 572 of an instance of the generic modulator section 500 is in touch with the front end surface 571 of the next instance of the generic modulator section 500, the outer edge 522 of the two instances are lined up, and the outer edge 532 of the two instances are also lined up. The waveguide sections 510 of the multiple instances of the generic modulator section 500 collectively form the optical waveguide 110. The first conductor sections 520 of the multiple instances of the generic modulator section 500 collectively form the first conductor 121. Likewise, the second conductor sections 530 of the multiple instances of the generic modulator section 500 collectively form the second conductor 122.

The waveguide section 510 has one or more ridges (not shown in the generic modulator section 500), and each of the one or more ridges extends along the main propagation direction 111 from the front end surface 571 to the rear end surface 572. Moreover, the waveguide section 510 is further divided into two parts: an active segment 540 and a passive segment 550. Each of the one or more ridges of the waveguide section 510 runs through both the active segment 540 and the passive segment 550. The active segment 540 has one or more p-n junction diodes, whereas the passive segment 550 does not have a p-n junction diode. Each of the p-n junction diodes has a p-n junction that is located within a respective one of the one or more ridges and extends along the main propagation direction 111.

The definition of the various parts of the generic modulator section 500 can be applied to each of the modulator sections of FIG. 3. For example, FIG. 5 shows the modulator section 385 with the various parts (i.e., the waveguide section 510, the first conductor section 520, the second conductor section 530, the active segment 540, and the passive segment 550) annotated thereon. An illustration 501 specifically denotes the active segment 540 and the passive segment 550 of the waveguide section 510 of the modulator section 385. As shown in the illustration 501, the ridge 350 runs through both the active segment 540 and the passive segment 550. The active segment 540 includes the p-n junction diode 375, and the p-n junction 330 of the p-n junction diode 375 is located within the ridge 350. In view of the top view of the whole E-O modulator of FIG. 3, the optical signal that propagates within the optical waveguide 110 travels alternatively through the active segments 540 and the passive segments 550 of the optical waveguide 110.

As mentioned elsewhere herein, the transmission line 120 is a slow-wave transmission line that helps to reduce the velocity mismatch between the optical path and the electrical path of the E-O modulator 100. With various shapes or patterns of the first and second electrical conductors 121 and 122, which are described in greater detail further below, the transmission line 120 is able to slow down the propagation velocity of the electrical modulation signal to an extent that the electrical modulation signal travels substantially at the same speed as the optical signal traveling in the optical waveguide 110. Either or both of the first and second electrical conductors 121 and 122 includes recesses or thin slots that form the conductor into a shape having a plurality of teeth, like a comb. For example, as shown in FIG. 3 and FIG. 4, each of the electrical conductors 121 and 122 have multiple recesses or slots, such as slots 361 and 362, that make the electrical conductors 121 and 122 into a comb-like shape. The shapes and the placement locations of the slots are designed to increase an effective inductance of the transmission line 120, thereby slowing down the group velocity of the electrical modulation signal that travels thereon.

The slots 361 and 362 are also shown in the annotated illustration of the modulator section 385 in FIG. 5. As shown in FIG. 5, the first conductor section 520 of the modulator section 385 includes the slot 361, and the second conductor section 530 of the modulator section 385 includes the slot 362. The slot 361 is a recess in the first conductor section 520 that extends from the inner edge 521 towards a central area of the first conductor section 520. Likewise, the slot 362 is a recess in the second conductor section 530 that extends from the inner edge 531 towards a central area of the second conductor section 530. Both the slots 361 and 362 extend in a direction that is substantially perpendicular to the main propagation direction 111. Also, the slots 361 and 362 are connected to the passive segment 550 of the waveguide section 510 of the modulator section 385. Specifically, the slot 361 has an opening 561 at the inner edge 521, and the opening 561 is connected with the waveguide section 510 at a location where the opening 561 is aligned with the passive segment 550. Likewise, the slot 362 has an opening 562 at the inner edge 531, and the opening 562 is connected with the waveguide section 510 at a location where the opening 562 is aligned with the passive segment 550.

Figure 6:
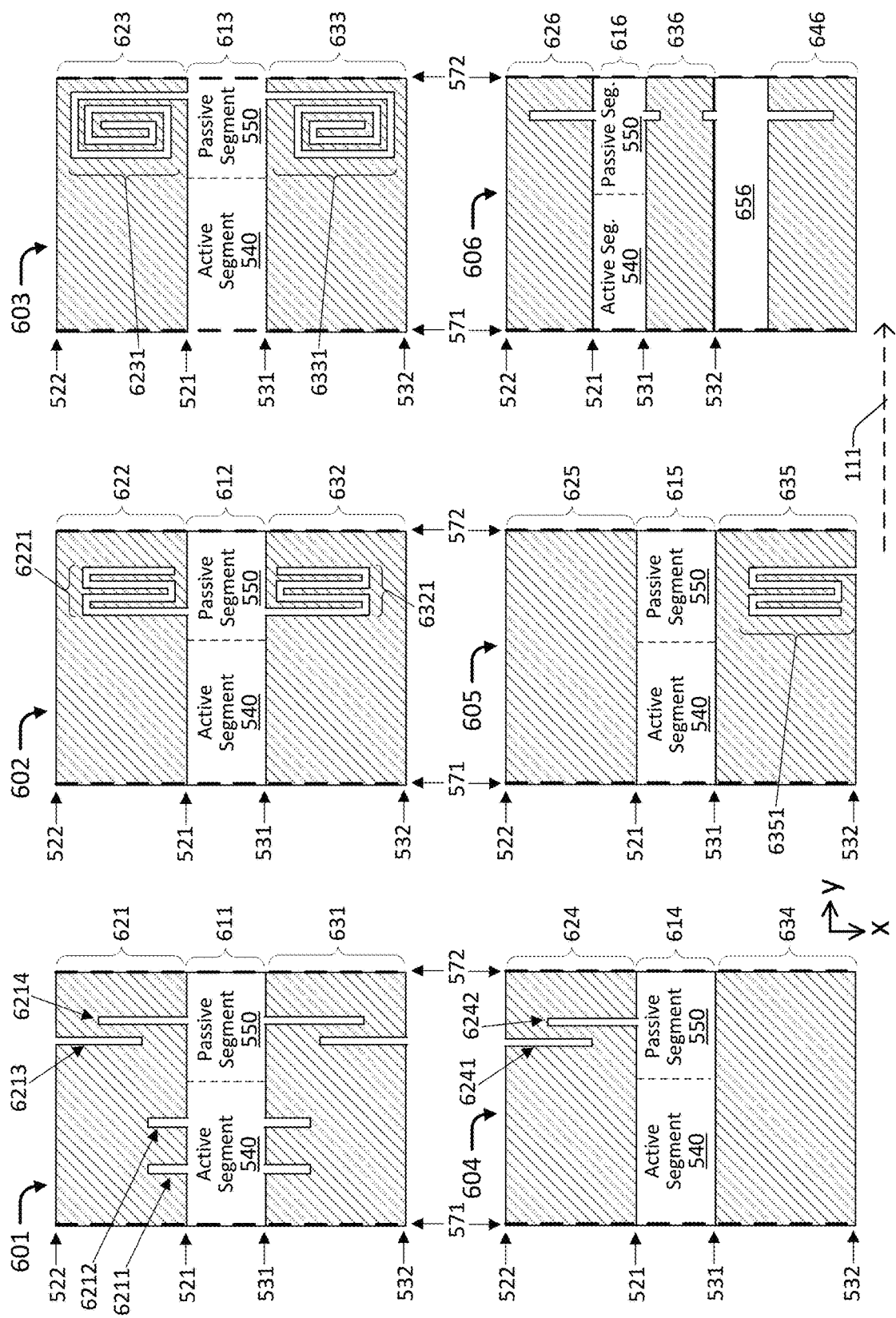
FIG. 6 illustrates modulator sections in accordance with various embodiments of the present disclosure.

FIG. 6 illustrates several example embodiments, i.e., embodiments 601, 602, 603, 604, 605 and 606, of the generic modulator section 500. The example embodiments 601, 602, 603, 604, 605 and 606 may be used to embody one, some, or all of the modulator sections of E-O modulator 100, e.g., any of the modulator sections 381, 385, 386, 387 and 388.

The embodiment 601 has a first conductor section 621 and a second conductor section 631 respectively disposed on two sides of the waveguide section 611. Each of the first and second conductor sections 621 and 631 include more than one recesses. For example, the first conductor section 621 includes recesses 6211, 6212, 6213 and 6214. Each of the recesses 6211, 6212 and 6214 is a slot that extends from the inner edge 521 of the first conductor section 621 towards a central area of the first conductor section 621, whereas the recess 6213 is a slot that extends from the outer edge 522 of the first conductor section 621 towards a central area of the first conductor section 621. The slots 6211, 6212, 6213 and 6214 extend in a direction that is substantially perpendicular to the main propagation direction 111. Whereas the slot 6213 has an opening at the outer edge 522 of the first conductor section 621, each of the slots 6211, 6212 and 6214 has an opening at the inner edge 521 of the first conductor section 621 that is connected to the waveguide section 611. The openings of the slots 6211 and 6212 are aligned with the active segment 540 of the waveguide section 611, whereas the opening of the slot 6214 is aligned with the passive segment 550 of the waveguide section 611. The second conductor section 631 also includes four recesses. The first conductor section 621 and the second conductor section 631, including the recesses of each, may be symmetrical with respect to the waveguide section 611.

The embodiment 602 has a first conductor section 622 and a second conductor section 632 respectively disposed on two sides of the waveguide section 612. The first conductor section 622 includes a winding slot 6221 that has a zigzag shape. The second conductor section 632 includes a winding slot 6321 that also has a zigzag shape. Each of the slots 6221 and 6321 has an opening at the inner edge 521 or 531 that is connected to the waveguide section 612. Moreover, each of the slots 6221 and 6321 extends in a direction that is substantially perpendicular to the main propagation direction 111. Compared with a straight slot such as the slot 6213 or 6214, a winding slot such as the slot 6221 or 6321 is able to result in a higher effective inductance of the transmission line.

A winding slot may take a shape other than a zigzag shape to increase the effective inductance of the transmission line, such as a spiral shape. The embodiment 603 has a first conductor section 623 and a second conductor section 633 respectively disposed on two sides of the waveguide section 613. The first conductor section 623 includes a winding slot 6231 that has a spiral shape. Likewise, the second conductor section 633 includes a winding slot 6331 that also has a spiral shape. Each of the slots 6231 and 6331 has an opening at the inner edge 521 or 531 that is connected to the waveguide section 613. Moreover, each of the slots 6231 and 6331 extends in a direction that is substantially perpendicular to the main propagation direction 111. Compared with straight slots such as the slots 6213 and 6214, the spiral slots 6231 and 6331 are able to result in a higher effective inductance of the transmission line.

In some embodiments, the first conductor section 520 and the second conductor section 530 may not both include one or more recesses. Namely, it may be that either the first conductor section 520 or the second conductor section 530, but not both, has one or more recesses. For example, the embodiment 604 has a first conductor section 624 and a second conductor section 634 respectively disposed on two sides of the waveguide section 614. The first conductor section 624 includes recesses 6241 and 6242, whereas the second conductor section 634 is simply a rectangular conductor and does not have any recess. As another example, the embodiment 605 has a first conductor section 625 and a second conductor section 635 respectively disposed on two sides of the waveguide section 615. The second conductor section 635 includes a recess 6351, whereas the first conductor section 625 is simply a rectangular conductor and does not have any recess.

In some embodiment, a modulator section may include a third conductor section. For example, the modulator section 606 includes a third conductor section 646. The embodiment 606 has a first conductor section 626 and a second conductor section 636 respectively disposed on two sides of the waveguide section 616, and, like the first conductor section 626 and a second conductor section 636, the third conductor section 646 also extends along the main propagation direction 111 from the front end surface 571 of the modulator section 606 to the rear end surface 572 thereof. The third conductor section 646 is spaced from the second conductor section 636 by a space 656 on the x-y plane. Unlike the waveguide section 616, the space 656 includes neither a p-n junction nor a ridge.

When several instances of the modulator sector 606 are concatenated to form a monolithic embodiment of the E-O modulator 100, the third conductor sections 646 of the several instances of the modulator sector 606 collectively form a continuous third electrical conductor that runs along the main propagation direction 111. The embodiment of the E-O modulator 100 also has the first electrical conductor 121 formed by the first conductor section 626 concatenated together, as well as the second electrical conductor 122 formed by the second conductor section 636 concatenated together. The first electrical conductor 121, the second electrical conductor 122 and the third electrical conductor collectively form a coplanar waveguide (CPW) transmission line for conducting the electrical modulation signal. In some embodiments, the space 656 has a same dimension along the x-axis as the waveguide section 616. In some embodiments, the second conductor section 636 and the third conductor section 646 are symmetrical with respect to the first conductor section 616.

Figure 7:
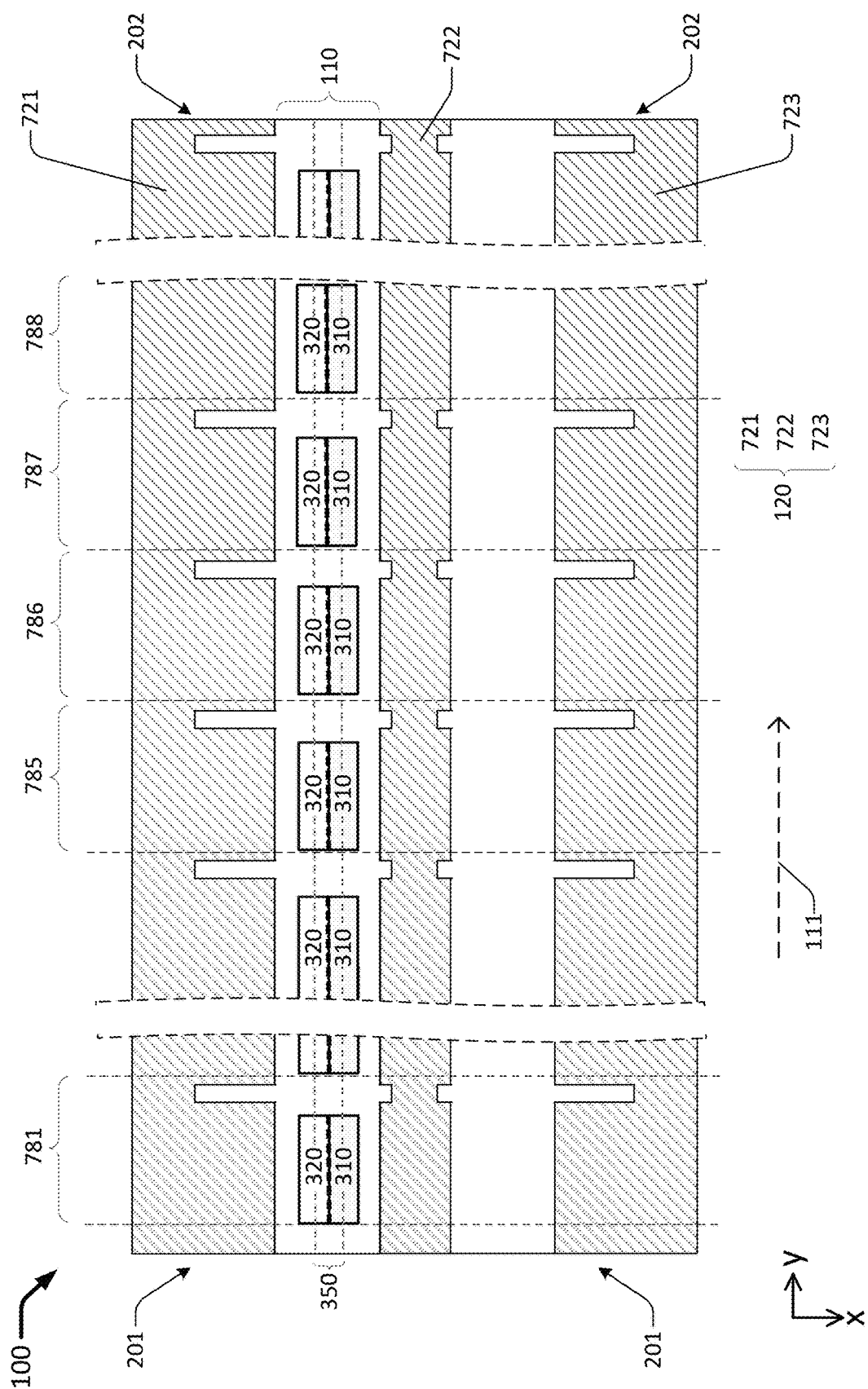
FIG. 7 illustrates a top view of a monolithic E-O modulator that employs a coplanar waveguide (CPW) transmission line in accordance with an embodiment of the present disclosure.

FIG. 7 illustrates an embodiment 700 of the monolithic E-O modulator 100 that is formed by multiple instances of the modulator section 606 concatenated together. The monolithic E-O modulator 700 includes a plurality of modulator sections, such as modulator sections 781, 785, 786, 787 and 788, each embodied by the modulator section 606. The first conductor sections 626 of the plurality of modulator sections collectively form a continuous first electrical conductor 721; the second conductor sections 636 of the plurality of modulator sections collectively form a continuous second electrical conductor 722; also the third conductor sections 646 of the plurality of modulator sections collectively form a continuous third electrical conductor 723. In the embodiment 700, the transmission line 120 is a CPW transmission line that is formed by the first electrical conductor 721, the second electrical conductor 722, and a third electrical conductor 723.

Figure 8:
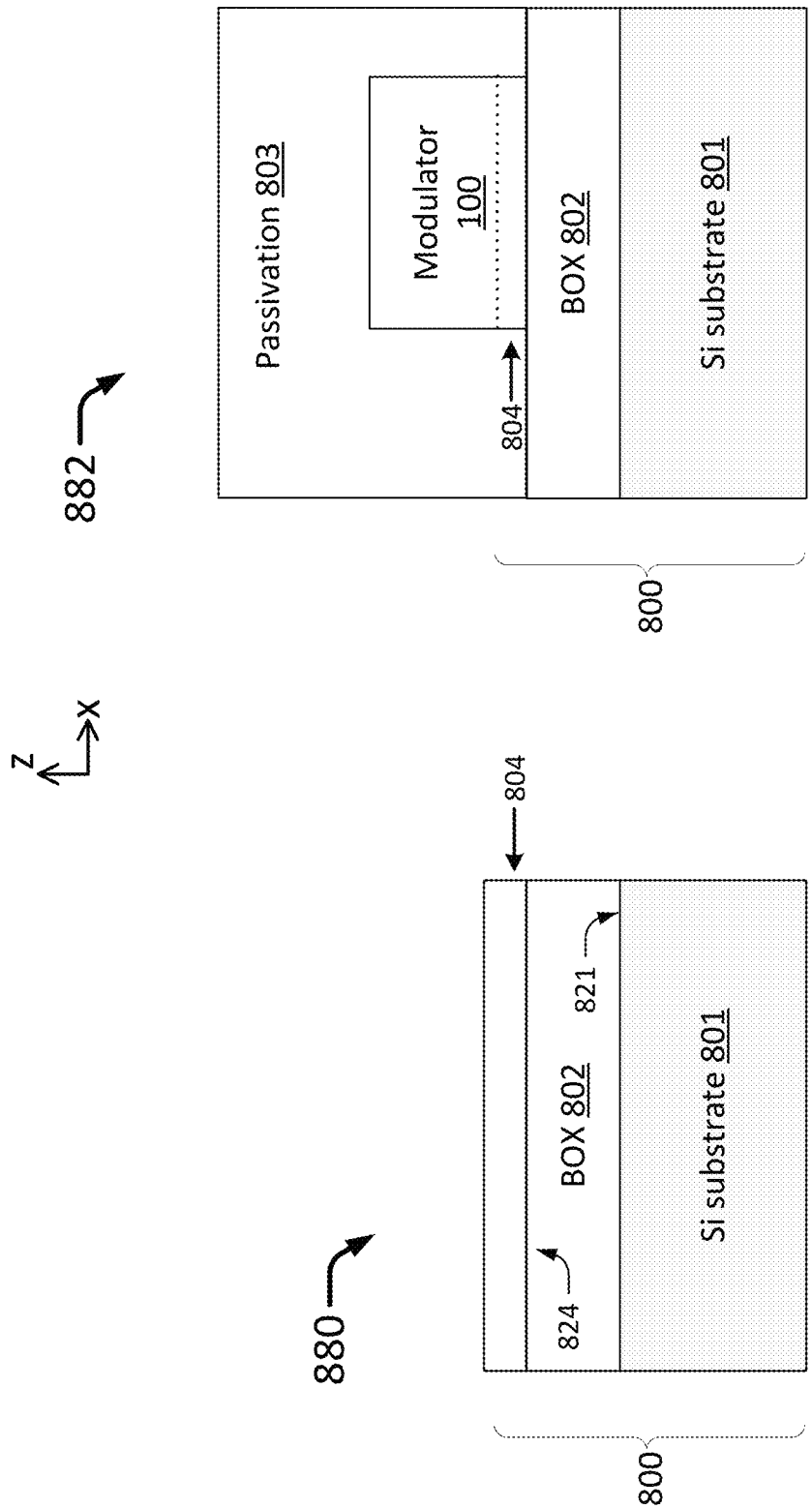
FIG. 8 illustrates a cross-sectional view of an E-O modulator fabricated on a silicon-on-insulator (SOI) substrate in accordance with an embodiment of the present disclosure.

The E-O modulator 100 may be fabricated on a silicon-on-insulator (SOI) substrate, such as a SOI substrate 800 of FIG. 8. Specifically, FIG. 8 illustrates a cross-sectional view 880 of the SOI substrate 800 before an E-O modulator, such as the modulator 100, is fabricated thereon. FIG. 8 also illustrates a cross-sectional view 882 of the SOI substrate 800 after an E-O modulator, such as the modulator 100, is fabricated thereon. The cross-sectional views 880 and 882 as shown are parallel to the x-z plane of FIG. 2. Typically, the SOI substrate 800 comprises three different layers of material, with a buried oxide (BOX) layer 802 sandwiched between a bulk silicon substrate 801 and a top silicon layer 804. Namely, the top silicon layer 804 and the bulk silicon substrate 801 are disposed respectively on two opposite sides of the BOX layer 802. The BOX layer 802 has two opposing surfaces: an upper surface 824 and a lower surface 821. The top silicon layer 804 meets the BOX layer 802 at the upper surface 824, whereas the bulk silicon substrate 801 meets the BOX layer 802 at the lower surface 821. As described above, the top silicon layer 804 typically has a thickness in the z-direction that is significantly smaller than that of the bulk silicon substrate 801. Moreover, the optical waveguide 110 of the modulator 100, particularly the plurality of p-n junction diodes 112, is fabricated in the top silicon layer 804. Also, as shown in the cross-sectional view 882, after the modulator 120 is fabricated, a thick oxide/passivation layer 803 is deposited over the SOI substrate to protect the modulator 100.

Figure 9:
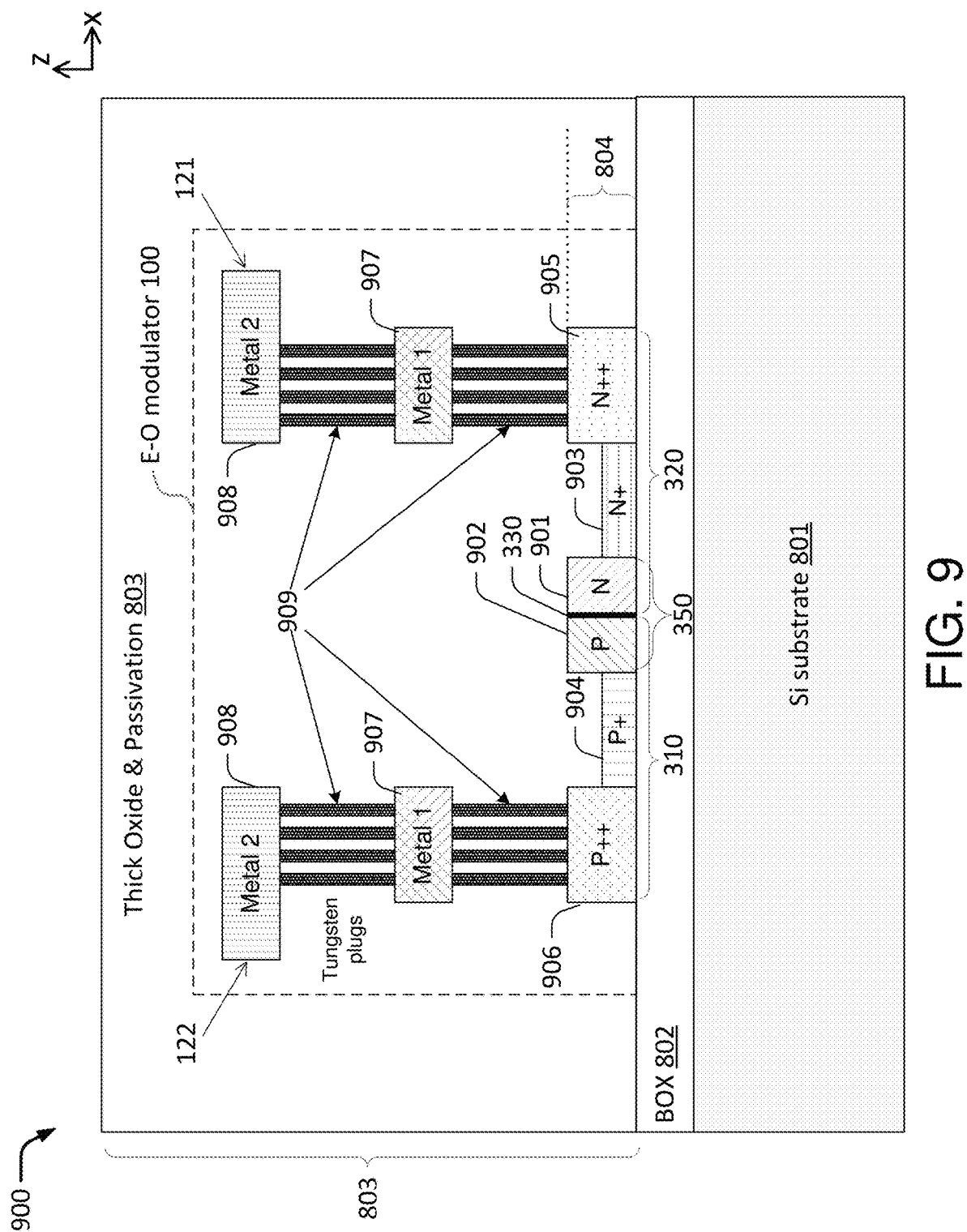
FIG. 9 illustrates a cross-sectional view of the E-O modulator of FIG. 8.

FIG. 9 illustrates a cross-sectional view 900, which is a more detailed version of the cross-sectional view 882. The cross-sectional view 900 shows a cross section of the modulator 100 fabricated on the SOI substrate 800, along a line A-A of FIG. 3, which intersects the p-n junction diode 371. The cross section revealed by the cross-sectional view 900 is in parallel with the x-y plane of the slab 200. Specifically, various dopant regions, silicide, and metallization that make up the modulator 100 are shown in the cross-sectional view 900, including a N doped silicon region 901, a P doped silicon region 902, a N+ doped silicon region 903, a P+ doped silicon region 904, a N++ doped silicon region 905, a P++ doped silicon region 906, a metal-one layer 907, and a metal-two layer 908. In addition, tungsten plugs 909 that provide inter-layer electrical connections are shown. The vias 415, 416 and 417 may be realized by the tungsten plugs 909. As shown in the cross-sectional view 900, the tungsten plugs 909 are used to electrically couple the metal-one layer 907 to the metal-two layer 908. In addition, the tungsten plugs 909 are also used to electrically couple the metal-one layer 907 to each of the N++ doped silicon region 905 and the P++ doped silicon region 906. The metal-two layer 908 is used to form the electrical conductors 121 and 122.

Each of the N doped silicon region 901, the P doped silicon region 902, the N+ doped silicon region 903, the P+ doped silicon region 904, the N++ doped silicon region 905, and the P++ doped silicon region 906 may represent a cross section of a stripe or a longitudinal section that runs along the main propagation direction 111. The p-type stripe 310 is collectively formed by a section represented by the P doped silicon region 902, a section represented by the P+ doped silicon region 904, and a section represented by the P++ doped silicon region 906. Similarly, the n-type stripe 320 is collectively formed by a section represented by the N doped silicon region 901, a section represented by the N+ doped silicon region 903, and a section represented by the N++ doped silicon region 905. The p-n junction 330 is formed between the section represented by the P doped silicon region 902 and the section represented by the N doped silicon region 901.

As shown in FIG. 9, the N doped silicon region 901 and the P doped silicon region 902 are disposed alongside and adjacent to one another. The N+ doped silicon region 903 is disposed alongside and adjacent to the N doped silicon region 901, opposing the P doped silicon region 902. Similarly, the P+ doped silicon region 904 is disposed alongside and adjacent to the P doped silicon region 902, opposing the N doped silicon region 901. In addition, the N++ doped silicon region 905 is disposed alongside and adjacent to the N+ doped silicon region 903, opposing the N doped silicon region 901. Similarly, the P++ doped silicon region 906 is disposed alongside and adjacent to the P+ doped silicon region 904, opposing the P doped silicon region 902. The doped regions 901-906 are formed in the top silicon layer 804 and are located on a same side of the BOX layer 802.

Each of the doped regions 901-906 may be formed by providing a specific level of N type or P type dopants in a specific region of the top silicon layer 804. Moreover, each layer or doped region in FIG. 9 may have a preferred range of thickness in the z-direction. In some embodiments, each of the N doped silicon region 901 and the P doped silicon region 902 may have a thickness in a range of 100-500 nanometers (nm), as well as a doping concentration in a range of 1e17-1e18 per cubic centimeter ($cm^{-3}$). In some embodiments, each of the N+ doped silicon region 903 and the P+ doped silicon region 904 may have a thickness in a range of 70-320 nm, as well as a doping concentration in a range of 1e18-5e18 $cm^{-3}$. In some embodiments, each of the N++ doped silicon region 905 and the P++ doped silicon region 906 may have a thickness in a range of 150-400 nm, as well as a doping concentration in a range of 1e19-1e22 $cm^{-3}$. Each of the metal-one layer 907 and the metal-two layer 908 may be made of electrically conductive metal, alloy or other material, such as aluminum-copper (Al—Cu) alloy. In some embodiments, the metal-one layer 907 may have a thickness in a range of 0.3-0.8 micrometers (um), whereas the metal-two layer 908 may have a thickness in a range of 1.5-3 um. In some embodiments, the BOX layer 802 may have a thickness in a range of 2-4 um. The N doped silicon region 901 and the P doped silicon region 902 collectively form the ridge 350 of the optical waveguide 110.

Figure 10:
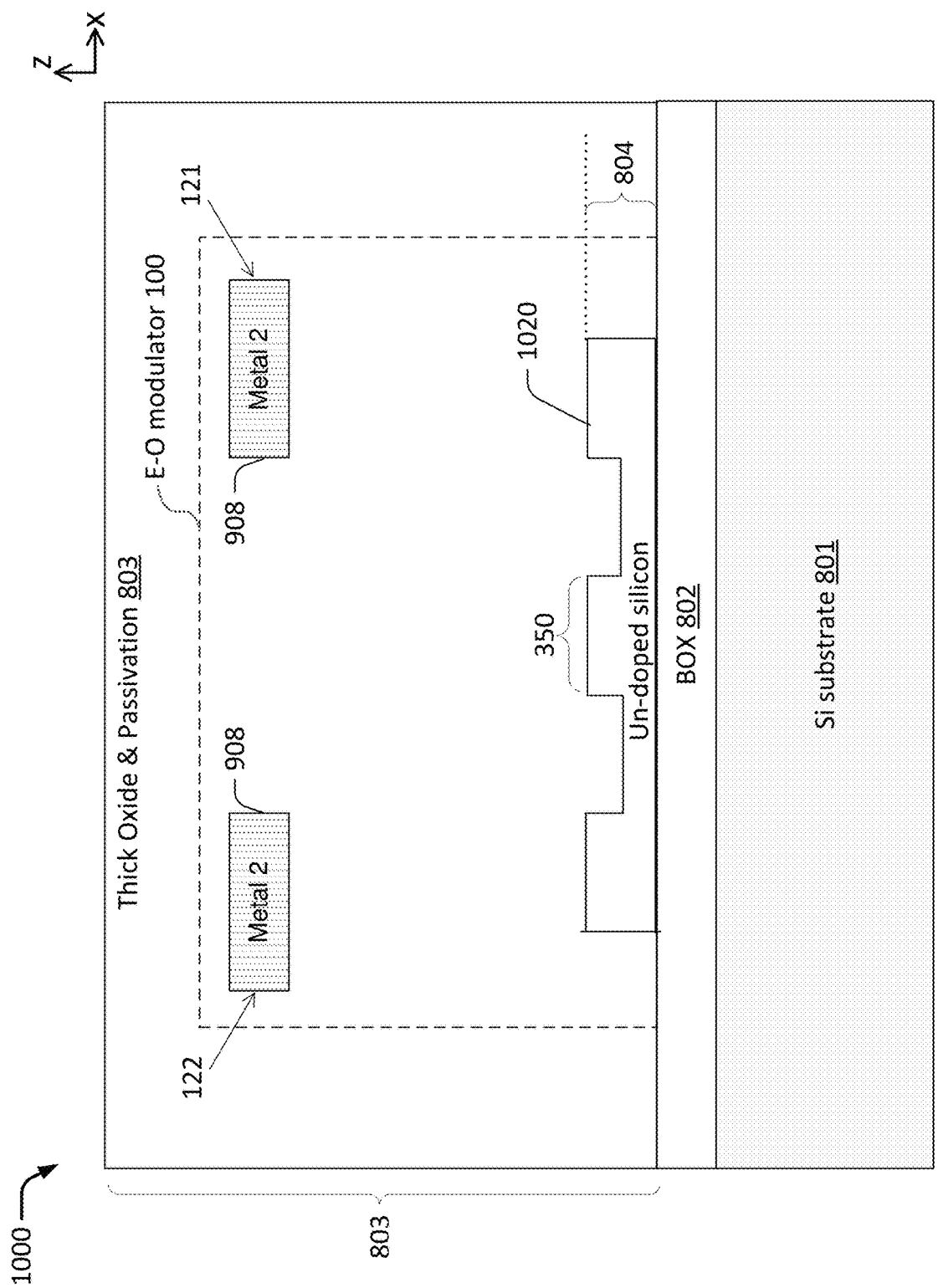
FIG. 10 illustrates another cross-sectional view of the E-O modulator of FIG. 8.

FIG. 10 illustrates a cross-sectional view 1000 of the modulator 100 along the line B-B of FIG. 3, which passes through the passive segment of the modulator section 381. The cross section revealed by the cross-sectional view 1000 is in parallel with the x-y plane of the slab 200. Since the line B-B does not intersect any of the plurality of p-n junction diodes 112, the top silicon layer 804 in the cross-sectional view 1000 is not doped with any P type or N type dopants at any concentration. However, the top silicon layer 804, being un-doped, is formed into a region 1020 that has a cross-sectional profile identical to a cross-sectional profile of a congregated area consist of a concatenation of the N doped silicon region 901, the P doped silicon region 902, the N+ doped silicon region 903, the P+ doped silicon region 904, the N++ doped silicon region 905, and the P++ doped silicon region 906 of the cross-sectional view 900. Along the main propagation direction 111 (i.e., the y-direction), the un-doped region 1020 of the cross-sectional view 1000 is continuously formed with the doped silicon region of the cross-sectional view 900 (i.e., comprising the regions 901-906) to provide the optical waveguide. In some embodiments, a height of the ridge 350 (i.e., a dimension of the N doped silicon region 901 and the P doped silicon region 902 in the z-direction) is in a range of 100-500 nm, whereas a width of the ridge 350 (i.e., a dimension of the N doped silicon region 501 and the P doped silicon region 502 combined in the x-direction) is in a range of 300-700 nm.

Figure 11:
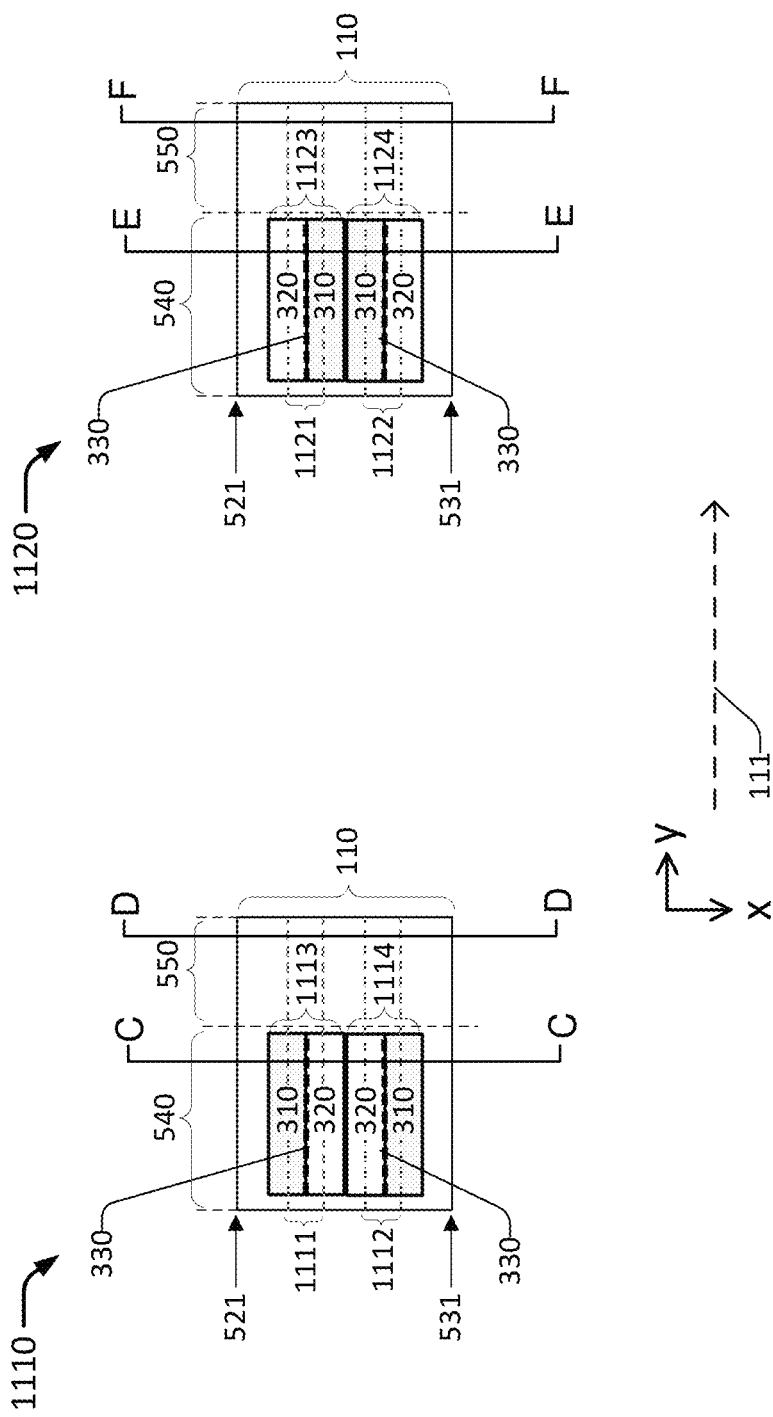
FIG. 11 illustrates example waveguide sections of an E-O modulator.

In some embodiments, the optical waveguide 110 may include two or more ridges disposed in parallel, with each of the ridges extending from the first surface 201 of the slab 200 to the second surface 202 of the slab 200 along the main propagation direction 111. In an event that the optical waveguide 110 includes two or more ridges, the waveguide section 510 of the modulator section 500 includes two or more p-n junction diodes connected in series, wherein each of the two or more p-n junction diodes has a p-n junction located within a respective one of the two or more ridges, with the p-n junction of the p-n junction diode extending along the main propagation direction 111. FIG. 11 illustrates example embodiments 1110 and 1120 of the waveguide section 510. Each of embodiments 1110 and 1120 includes two p-n junction diodes connected in series with reversed polarities.

Specifically, the waveguide section 1110 has two ridges 1111 and 1112, both of which extend along the main propagation direction 111. The active segment 540 of the waveguide section 1110 has two p-n junction diodes 1113 and 1114, each of which has a p-type stripe 310 and a n-type stripe 320 that are disposed adjacent to one another, with the p-n junction 330 formed therebetween. The p-n junction 330 of the p-n junction diode 1113 is located within the ridge 1111, whereas the p-n junction 330 of the p-n junction diode 1114 is located within the ridge 1112. Moreover, the p-n junction diodes 1113 and 1114 are disposed adjacent to one another with reversed polarities so that the two n-type stripes 320 of the two p-n junction diodes 1113 and 1114 are connected together. Waveguide section 1110 can be used to embody any waveguide section of FIG. 3, FIG. 5, FIG. 6 or FIG. 7, wherein the p-type stripe 310 of the p-n junction diode 1113 is electrically coupled with the first conductor section thereof, and wherein the p-type stripe 310 of the p-n junction diode 1114 is electrically coupled with the second conductor section thereof. For example, in an event that the waveguide section 510 of the modulator section 500 is embodied by the waveguide section 1110, the p-type stripe 310 of the p-n junction diode 1113 is electrically coupled with the first conductor section 520 of the modulator section 500, and the p-type stripe 310 of the p-n junction diode 1114 is electrically coupled with the second conductor section 530 of the modulator section 500. As another example, in an event that the waveguide section 616 of the modulator section 606 is embodied by the waveguide section 1110, the p-type stripe 310 of the p-n junction diode 1113 is electrically coupled with the first conductor section 626 of the modulator section 606, and the p-type stripe 310 of the p-n junction diode 1114 is electrically coupled with the second conductor section 636 of the modulator section 606.

The waveguide section 1120 is similar to the waveguide section 1110, with the difference being that the two p-type stripes 310 therein, rather than the two n-type stripes 320, are connected together. Namely, the waveguide section 1120 also has two ridges, i.e., ridges 1121 and 1122. Both of the ridges 1121 and 1122 also extend along the main propagation direction 111. The active segment 540 of the waveguide section 1120 also has two p-n junction diodes, i.e., diodes 1123 and 1124. Each of the p-n junction diodes 1123 and 1124 also has a p-type stripe 310 and a n-type stripe 320 that are disposed adjacent to one another, with the p-n junction 330 formed therebetween. The p-n junction 330 of the p-n junction diode 1123 is located within the ridge 1121, whereas the p-n junction 330 of the p-n junction diode 1124 is located within the ridge 1122. The p-n junction diodes 1123 and 1124 are disposed adjacent to one another with reversed polarities so that the two p-type stripes 310 of the two p-n junction diodes 1113 and 1114 are connected together. Waveguide section 1120 can also be used to embody any waveguide section of FIG. 3, FIG. 5, FIG. 6 or FIG. 7, wherein the n-type stripe 320 of the p-n junction diode 1123 is electrically coupled with the first conductor section thereof, and wherein the n-type stripe 320 of the p-n junction diode 1124 is electrically coupled with the second conductor section thereof. For example, in an event that the waveguide section 510 of the modulator section 500 is embodied by the waveguide section 1120, the n-type stripe 320 of the p-n junction diode 1123 is electrically coupled with the first conductor section 520 of the modulator section 500, and the n-type stripe 320 of the p-n junction diode 1124 is electrically coupled with the second conductor section 530 of the modulator section 500. As another example, in an event that the waveguide section 616 of the modulator section 606 is embodied by the waveguide section 1120, the n-type stripe 320 of the p-n junction diode 1123 is electrically coupled with the first conductor section 626 of the modulator section 606, and the n-type stripe 320 of the p-n junction diode 1124 is electrically coupled with the second conductor section 636 of the modulator section 606.

Figure 12:
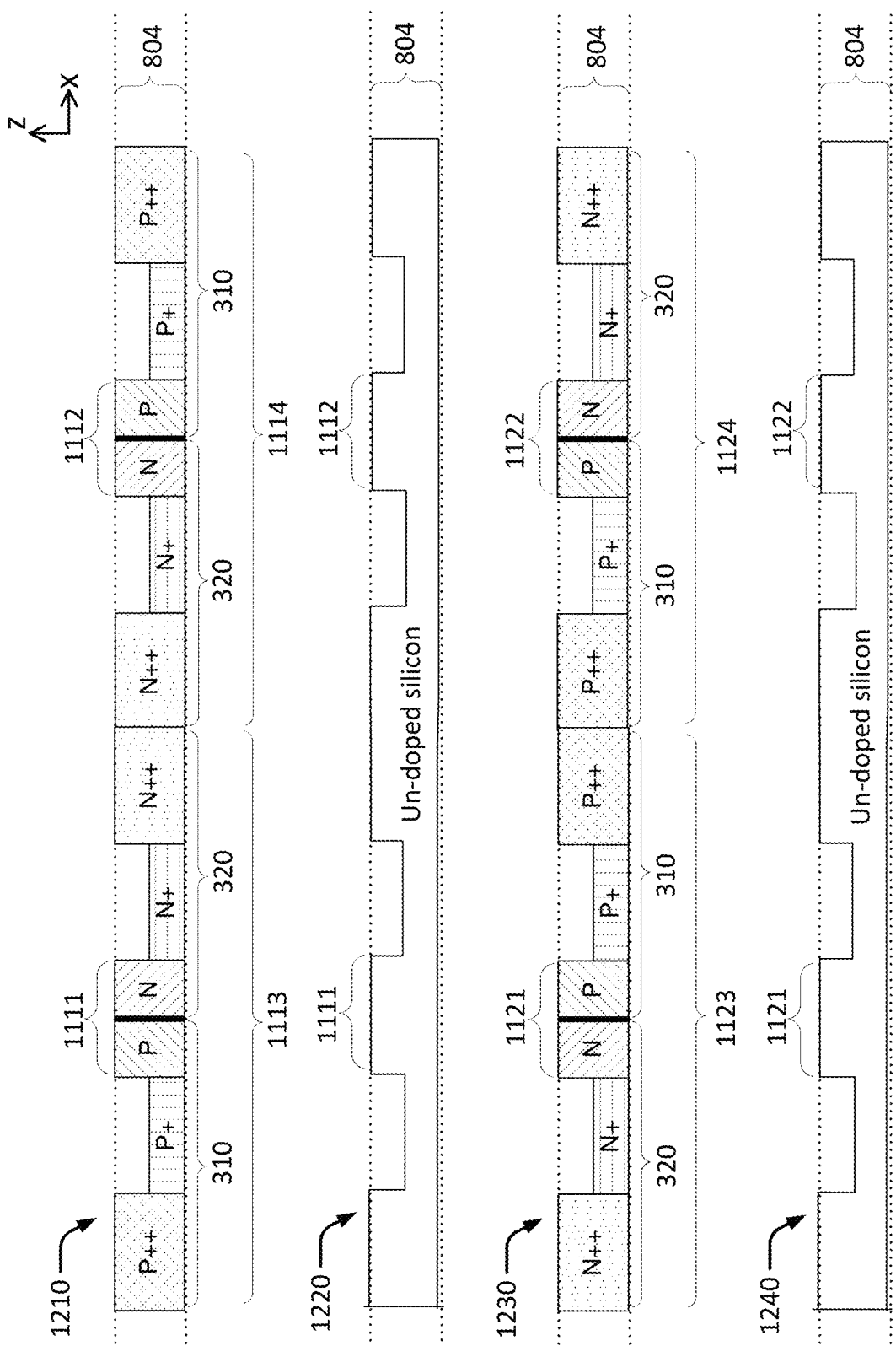
FIG. 12 illustrates cross-sectional views of the waveguide sections of FIG. 11.

FIG. 12 illustrates a few cross-sectional views of the waveguide sections 1110 and 1120 along lines C-C, D-D, E-E and F-F of FIG. 11. Each of the cross-sectional views 1210, 1220, 1230 and 1240 reveals a cross section of the waveguide section 1110 or 1120 that is in parallel with the x-y plane of the slab 200. Specifically, the cross-sectional view 1210 reveals the cross section along the line C-C of FIG. 11, which intersects the active segment 540 of the waveguide section 1110. The cross-sectional view 1220 reveals the cross section along the line D-D of FIG. 11, which intersects the passive segment 550 of the waveguide section 1110. The cross-sectional view 1230 reveals the cross section along the line E-E of FIG. 11, which intersects the active segment 540 of the waveguide section 1120. The cross-sectional view 1240 reveals the cross section along the line F-F of FIG. 11, which intersects the passive segment 550 of the waveguide section 1120. As shown in cross sections 1210 and 1220, the top silicon layer 804 is formed to have a same profile in both the active segment 540 and the passive segment 550 of the waveguide section 1110. Similarly, as shown in cross sections 1230 and 1240, the top silicon layer 804 is formed to have a same profile in both the active segment 540 and the passive segment 550 of the waveguide section 1120. For both the waveguide section 1110 and the waveguide section 1120, however, the top silicon layer 804 in the passive segment 550 is undoped.

The two p-n junction diodes 1113 and 1114 of the waveguide section 1110 are connected in series with reversed polarities so that the two p-n junction diodes 1113 and 1114 are biased by the electrical modulation signal of the E-O modulator 100 in a series-push-pull (SPP) fashion. Namely, at any time and regardless of the actual voltage level of the electrical modulation signal, one of the two p-n junction diodes 1113 and 1114 is substantially reverse-biased by the electrical modulation signal, while the other of the two p-n junction diodes 1113 and 1114 is substantially forward-biased by the electrical modulation signal. Likewise, the waveguide section 1120 is also capable of making a SPP E-O modulator, as the two p-n junction diodes 1123 and 1124 are also connected in series with reversed polarities.

Various embodiments described herein provide technical advantages that enable a high-speed operation of an E-O modulator, in particular a monolithic E-O modulator fabricated on a SOI substrate. Specifically, the employment of a slow-wave transmission line, which has a plurality of recesses or slots along the electrical conductors of the transmission line, effectively slows down the group velocity of the electrical modulation signal carried by the slow-wave transmission line, thereby reducing the velocity mismatch between the optical path and the electrical path of the E-O modulator. The reduced velocity mismatch helps to realize a higher operating bandwidth of the E-O modulator, a key component in contemporary high-speed optical communication systems.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A monolithic electro-optical (E-O) modulator configured to accommodate an optical signal that propagates along a main propagation direction, the E-O modulator comprising a plurality of modulator sections concatenated in series along the main propagation direction, each of the plurality of modulator sections comprising:
    a waveguide section having one or more ridges extending along the main propagation direction, the waveguide section comprising an active segment and a passive segment, the active segment comprising one or more p-n junction diodes each having a p-n junction located within a respective one of the one or more ridges, the p-n junction extending along the main propagation direction;
    a first conductor section extending along the main propagation direction and disposed on a first side of the waveguide section; and
    a second conductor section extending along the main propagation direction and disposed on a second side of the waveguide section opposing the first side,
    wherein:
        either or both of the first conductor section and the second conductor section have one or more recesses each extending from an edge of the respective conductor section towards a central area of the respective conductor section, the edge substantially in parallel with the main propagation direction,
        the waveguide sections of the plurality of modulator sections collectively form a continuous waveguide running along the main propagation direction for accommodating the optical signal,
        the first conductor sections of the plurality of modulator sections collectively form a continuous first conductor running along the main propagation direction,
        the second conductor sections of the plurality of modulator sections collectively form a continuous second conductor running along the main propagation direction,
        the first and second conductors form a transmission line configured to conduct an electrical modulation signal that biases the one or more p-n junction diodes, and
        each of the one or more recesses comprises a slot extending in a direction substantially perpendicular to the main propagation direction.

2. The monolithic E-O modulator of claim 1, wherein the slot comprises a zigzag shape.

3. The monolithic E-O modulator of claim 1, wherein the slot comprises a spiral shape.

4. The monolithic E-O modulator of claim 1, wherein each of the one or more recesses has an opening at the edge, the opening connected with the waveguide section.

5. The monolithic E-O modulator of claim 4, wherein the opening is aligned with the passive segment.

6. The monolithic E-O modulator of claim 1, wherein both the first conductor section and the second conductor section have the one or more recesses.

7. The monolithic E-O modulator of claim 6, wherein the one or more recesses of the first conductor section and the one or more recesses of the second conductor section are symmetrical with respect to the waveguide section.

8. The monolithic E-O modulator of claim 1, wherein:
    the waveguide section has one ridge,
    the active segment has one p-n junction diode, the p-n junction diode comprising a p-type stripe and an n-type stripe that are disposed adjacent to one another along the main propagation direction, the p-n junction being formed between the p-type stripe and the n-type stripe,
    the n-type stripe is electrically coupled with the first conductor section,
    the p-type stripe is electrically coupled with the second conductor section, and
    the p-n junction diode is substantially reversed-biased by the electrical modulation signal.

9. The monolithic E-O modulator of claim 8, wherein:
    each of the plurality of modulator sections further comprises a third conductor section extending along the main propagation direction, the second conductor section and the third conductor section being symmetrical with respect to the first conductor section,
    the third conductor sections of the plurality of modulator sections collectively form a continuous third conductor running along the main propagation direction, and
    the first, second and third conductors form a coplanar waveguide (CPW) transmission line for conducting the electrical modulation signal.

10. The monolithic E-O modulator of claim 1, wherein the monolithic E-O modulator is fabricated on a silicon-on-insulator (SOI) substrate, the SOI substrate comprising a bulk silicon substrate, a buried oxide (BOX) layer disposed on top of the bulk silicon substrate, and a top silicon layer disposed on top of the BOX layer.

11. The monolithic E-O modulator of claim 10, wherein each of the one or more ridges is formed in the top silicon layer with a height in a range of 100-500 nanometers (nm) and a width in a range of 300-700 nm.

12. The monolithic E-O modulator of claim 10, wherein:
    the one or more p-n junction diodes are formed in the top silicon layer,
    each of the one or more p-n junction diodes comprises a p-type stripe and an n-type stripe that are disposed adjacent to one another along the main propagation direction,
    the p-type stripe comprises a P doped region, a P+doped region disposed adjacent to the P doped region, and a P++doped region disposed adjacent to the P+doped region,
    the n-type stripe comprises an N doped region, an N+doped region disposed adjacent to the N doped region, and an N++doped region disposed adjacent to the N+doped region, and
    the p-n junction is formed between the P doped region and the N doped region.

13. The monolithic E-O modulator of claim 12, wherein each of the P doped region and the N doped region has a doping concentration in a range of 1e17-1e18 per cubic centimeter.

14. The monolithic E-O modulator of claim 12, wherein each of the P+doped region and the N+doped region has a doping concentration in a range of 1e18-5e18 per cubic centimeter.

15. The monolithic E-O modulator of claim 12, wherein each of the P++doped region and the N++doped region has a doping concentration in a range of 1e 19-1e22 per cubic centimeter.

16. A monolithic electro-optical (E-O) modulator configured to accommodate an optical signal that propagates along a main propagation direction, the E-O modulator comprising a plurality of modulator sections concatenated in series along the main propagation direction, each of the plurality of modulator sections comprising:
    a waveguide section having one or more ridges extending along the main propagation direction, the waveguide section comprising an active segment and a passive segment, the active segment comprising one or more p-n junction diodes each having a p-n junction located within a respective one of the one or more ridges, the p-n junction extending along the main propagation direction;

a first conductor section extending along the main propagation direction and disposed on a first side of the waveguide section; and a second conductor section extending along the main propagation direction and disposed on a second side of the waveguide section opposing the first side, wherein:
  either or both of the first conductor section and the second conductor section have one or more recesses each extending from an edge of the respective conductor section towards a central area of the respective conductor section, the edge substantially in parallel with the main propagation direction,
  the waveguide sections of the plurality of modulator sections collectively form a continuous waveguide running along the main propagation direction for accommodating the optical signal,
  the first conductor sections of the plurality of modulator sections collectively form a continuous first conductor running along the main propagation direction,
  the second conductor sections of the plurality of modulator sections collectively form a continuous second conductor running along the main propagation direction,
  the first and second conductors form a transmission line configured to conduct an electrical modulation signal that biases the one or more p-n junction diodes,
  the waveguide section has two ridges,
the active segment has two p-n junction diodes comprising a first p-n junction diode and a second p-n junction diode, each of the first and second p-n junction diodes comprising a p-type stripe and an n-type stripe that are disposed adjacent to one another along the main propagation direction, the p-n junction of the respective p-n junction diode being formed between the p-type stripe and the n-type stripe,
  the n-type stripe of the first p-n junction diode is connected with the n-type stripe of the second p-n junction diode,
  the p-type stripe of the first p-n junction diode is electrically coupled with the first conductor section, and
  the p-type stripe of the second p-n junction diode is electrically coupled with the second conductor section.

17. The monolithic E-O modulator of claim 16, wherein:
each of the plurality of modulator sections further comprises a third conductor section extending along the main propagation direction, the second conductor section and the third conductor section being symmetrical with respect to the first conductor section,
the third conductor sections of the plurality of modulator sections collectively form a continuous third conductor running along the main propagation direction, and
the first, second and third conductors form a coplanar waveguide (CPW) transmission line for conducting the electrical modulation signal.

18. A monolithic electro-optical (E-O) modulator configured to accommodate an optical signal that propagates along a main propagation direction, the E-O modulator comprising a plurality of modulator sections concatenated in series along the main propagation direction, each of the plurality of modulator sections comprising:

a waveguide section having one or more ridges extending along the main propagation direction, the waveguide section comprising an active segment and a passive segment, the active segment comprising one or more p-n junction diodes each having a p-n junction located within a respective one of the one or more ridges, the p-n junction extending along the main propagation direction;

a first conductor section extending along the main propagation direction and disposed on a first side of the waveguide section; and a second conductor section extending along the main propagation direction and disposed on a second side of the waveguide section opposing the first side, wherein:
  either or both of the first conductor section and the second conductor section have one or more recesses each extending from an edge of the respective conductor section towards a central area of the respective conductor section, the edge substantially in parallel with the main propagation direction,
  the waveguide sections of the plurality of modulator sections collectively form a continuous waveguide running along the main propagation direction for accommodating the optical signal,
  the first conductor sections of the plurality of modulator sections collectively form a continuous first conductor running along the main propagation direction,
  the second conductor sections of the plurality of modulator sections collectively form a continuous second conductor running along the main propagation direction,
  the first and second conductors form a transmission line configured to conduct an electrical modulation signal that biases the one or more p-n junction diodes,
  the waveguide section has two ridges,
  the active segment has two p-n junction diodes comprising a first p-n junction diode and a second p-n junction diode, each of the first and second p-n junction diodes comprising a p-type stripe and an n-type stripe that are disposed adjacent to one another along the main propagation direction, the p-n junction of the respective p-n junction diode being formed between the p-type stripe and the n-type stripe,
  the p-type stripe of the first p-n junction diode is connected with the p-type stripe of the second p-n junction diode,
  the n-type stripe of the first p-n junction diode is electrically coupled with the first conductor section, and
  the n-type stripe of the second p-n junction diode is electrically coupled with the second conductor section.

19. The monolithic E-O modulator of claim 18, wherein:
each of the plurality of modulator sections further comprises a third conductor section extending along the main propagation direction, the second conductor section and the third conductor section being symmetrical with respect to the first conductor section,
the third conductor sections of the plurality of modulator sections collectively form a continuous third conductor running along the main propagation direction, and the first, second and third conductors form a coplanar waveguide (CPW) transmission line for conducting the electrical modulation signal.

\* \* \* \* \*